(12) United States Patent
Kim et al.

(10) Patent No.: US 7,061,194 B2
(45) Date of Patent: Jun. 13, 2006

(54) METHOD AND APPARATUS FOR CONTROLLING CONSTANT LINEAR VELOCITY OF SPINDLE MOTOR USING MIRROR SIGNAL

(75) Inventors: Je-kook Kim, Yongin (KR); Young-wook Jang, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/700,644

(22) Filed: Nov. 4, 2003

(65) Prior Publication Data

US 2004/0095086 A1 May 20, 2004

(30) Foreign Application Priority Data

Nov. 9, 2002 (KR) .................................. 02-69419

(51) Int. Cl.
| | |
|---|---|
| H02P 1/00 | (2006.01) |
| H02P 1/22 | (2006.01) |
| H02P 1/40 | (2006.01) |
| H02P 3/00 | (2006.01) |
| H02P 3/20 | (2006.01) |

(52) U.S. Cl. ..................... 318/268; 318/269; 318/270; 318/271; 318/272

(58) Field of Classification Search ............. 369/30.13, 369/30.17, 44.11, 44.12, 44.25; 318/268–272, 318/560, 569
See application file for complete search history.

(56) References Cited

U.S. PATENT DOCUMENTS

| | | | | |
|---|---|---|---|---|
| 4,611,319 A | * | 9/1986 | Naito | 369/47.45 |
| 4,866,687 A | * | 9/1989 | Kasai et al. | 369/30.15 |
| 5,170,386 A | * | 12/1992 | Tateishi | 369/47.48 |
| 5,172,353 A | * | 12/1992 | Ito | 369/44.28 |
| 5,202,813 A | * | 4/1993 | Uota et al. | 361/154 |
| 5,239,530 A | * | 8/1993 | Seo et al. | 369/53.25 |
| 5,459,705 A | * | 10/1995 | Matoba et al. | 369/44.34 |
| 5,592,448 A | * | 1/1997 | Suzuki et al. | 369/44.28 |
| 5,594,307 A | * | 1/1997 | Adachi et al. | 318/280 |
| 5,629,924 A | * | 5/1997 | Yokogawa et al. | 369/275.3 |
| 5,717,672 A | * | 2/1998 | Furukawa et al. | 369/47.4 |
| 5,821,708 A | * | 10/1998 | Williams et al. | 318/254 |
| 5,844,871 A | * | 12/1998 | Maezawa | 369/44.28 |
| 6,091,688 A | * | 7/2000 | Tanoue et al. | 369/47.35 |
| 6,169,716 B1 | * | 1/2001 | Buchler | 369/59.17 |
| 6,349,078 B1 | * | 2/2002 | Hsu et al. | 369/30.16 |
| 6,377,523 B1 | * | 4/2002 | Yanagi | 369/44.28 |
| 6,424,606 B1 | * | 7/2002 | Okazaki et al. | 369/44.32 |
| 6,433,507 B1 | * | 8/2002 | Makaran et al. | 318/811 |
| 6,522,606 B1 | * | 2/2003 | Tanaka et al. | 369/44.36 |
| 6,586,898 B1 | * | 7/2003 | King et al. | 318/254 |
| 2002/0186631 A1 | * | 12/2002 | Takayama et al. | 369/47.45 |

(Continued)

FOREIGN PATENT DOCUMENTS

JP    9-27167    1/1997

(Continued)

*Primary Examiner*—David Martin
*Assistant Examiner*—Erick Glass
(74) *Attorney, Agent, or Firm*—Mills & Onello LLP (57) ABSTRACT

A method and an apparatus for precisely controlling the rotation speed of a spindle motor in an optical system according to a given condition are provided. The method involves counting in response to a clock signal widths of first and second logic states of an input signal, which varies with rotation speed of the spindle motor, when an operation control command is issued, comparing a predetermined reference value with a count value for one check cycle, and outputting the comparison result; and controlling the constant linear velocity of the spindle motor in response to the comparison result.

21 Claims, 6 Drawing Sheets

U.S. PATENT DOCUMENTS

2004/0052175 A1* 3/2004 Fedigan et al. .......... 369/47.39
2005/0040777 A1* 2/2005 Bekker ...................... 318/268
2005/0073918 A1* 4/2005 Ishikawa et al. ......... 369/44.25

FOREIGN PATENT DOCUMENTS

KR  0157562  7/1998

* cited by examiner

METHOD AND APPARATUS FOR CONTROLLING CONSTANT LINEAR VELOCITY OF SPINDLE MOTOR USING MIRROR SIGNAL

BACKGROUND OF THE INVENTION

This application claims the priority of Korean Patent Application No. 2002-69419, filed on Nov. 9, 2002, in the Korean Intellectual Property Office, the contents of which are incorporated herein in their entirety by reference.

1. Field of the Invention

The present invention relates to a method and an apparatus for controlling the constant linear velocity of a spindle motor used in an optical system, and more particularly, to a method and apparatus for controlling the constant linear velocity of a spindle motor used in an optical system by comparing the width of a mirror signal or an equivalent of the mirror signal in a first logic state to the width of the mirror signal or equivalent of the mirror signal in a second logic state.

2. Description of the Related Art

Optical systems are apparatuses for recording data on and/or reproducing data from an optical disk, such as a laser-disc (LD), a compact disc (CD), or a digital versatile disc (DVD).

A typical spindle motor, used in an apparatus that reproduces data from an optical disk, rotates an optical disk at a constant linear velocity (CLV). The rotation speed of the optical disk at the inner track is different from the rotation speed at the outer track. In addition, optical disks with different diameters, for example, 8 cm and 12 cm have different mass measurements.

Accordingly, when the servo of an apparatus, which reproduces data from an optical disk, attempts to stop the operation of a spindle motor or the rotation of an optical disk in response to a 'stop' command, it is difficult to precisely estimate how much force should be applied to the spindle motor in order to stop it. This is because, as described above, the rotation speed of an optical disk varies depending on whether measuring at an inner track or an outer track. In addition, it is also difficult to determine how long it will take to stop the spindle motor.

If an 'open' command is applied and the spindle motor is motionless in response to the 'stop' command, the optical disk may deviate from a chuck while rotating and then may skid in the tray, which results in damage to data recorded on the optical disk.

It is difficult to determine the speed of the optical disk because of the fact that the rotation speed of the optical disk varies by up to 1 X depending on the location of the pickup and/or depending on whether measuring the inner track or outer track of the optical disk. Thus, when a 'reproduce' command is applied, the spindle motor rotates in response to a CLV kick signal first and then the operation mode of the spindle motor changes to a CLV automatic mode. In this case, the rotation speed of the spindle motor is controlled based on estimation, and accordingly, the operation of the spindle motor is inevitably unstable and imprecise.

SUMMARY OF THE INVENTION

The present invention provides a method and an apparatus for precisely controlling the rotation speed of a spindle motor of an optical system based on given conditions.

According to an aspect of the present invention, there is provided a method of controlling a constant linear velocity of a spindle motor. The method includes counting in response to a clock signal widths of first and second logic states of an input signal, which varies with rotation speed of the spindle motor, when an operation control command is issued, comparing a predetermined reference value with a count value for one check cycle, and outputting the comparison result; and controlling the constant linear velocity of the spindle motor in response to the comparison result.

Preferably, the input signal is a mirror signal, a tracking zero cross signal, or the mirror signal clocked by the tracking zero cross signal.

Preferably, the operation control command is a stop command or a reproduce command.

Preferably, the count value increases in response to a first logic state of the clock signal and decreases in response to a second logic state of the clock signal.

Preferably, if the count value for one check cycle is greater than the predetermined reference value, the spindle motor stops operating.

Preferably, if the count value for one check cycle is less than the predetermined reference value, the count value is reset.

Preferably, the count value decreases in response to the first logic state of the clock signal and increases in response to the second logic state of the clock signal.

Preferably, if the count value for one check cycle is greater than the predetermined reference value, the spindle motor operates in constant linear velocity automatic mode.

According to an aspect of the present invention, there is provided a method of controlling a constant linear velocity of a spindle motor used in an optical system. The method includes counting up a width of a first logic state of a mirror signal, which varies with rotation speed of the spindle motor, or counting down a width of a second logic state of the mirror signal in response to a clock signal by using a counter for one check cycle when a stop command is issued, comparing a reference value with a count value obtained from the counter for one check cycle, and outputting the comparison result; and controlling the constant linear velocity of the spindle motor in response to the comparison result.

Preferably, if the count value for one check cycle is greater than the reference value, the spindle motor stops operating.

Preferably, if the count value for one check cycle is less than the reference value, the count value is reset.

According to an aspect of the present invention, there is provided a method of controlling the constant linear velocity of a spindle motor used in an optical system. The method includes counting down a width of a first logic state of a mirror signal, which varies with rotation speed of the spindle motor, or counting up a width of a second logic state of the mirror signal in response to a clock signal by using a counter for one check cycle, when a reproduce command is issued, comparing a reference value with a count value obtained from the counter for one check cycle, and outputting the comparison result; and controlling the constant linear velocity of the spindle motor in response to the comparison result.

Preferably, if the count value for one check cycle is greater than the reference value, the spindle motor operates in constant linear velocity automatic mode.

Preferably, if the count value for one check cycle is less than the reference value, the counter is reset.

According to another aspect of the present invention, there is provided a method of controlling a constant linear velocity of a spindle motor. The method includes comparing widths of first and second logic states of an input signal, which vary with rotation speed of the spindle motor in response to an operation control command and outputting the comparison result; and controlling the constant linear velocity of the spindle motor in response to the comparison result.

Preferably, the input signal is a mirror signal, a tracking zero cross signal, or the mirror signal clocked by the tracking zero cross signal.

Preferably, if the width of the first logic state of the input signal is greater than the width of the second logic state of the input signal, the spindle motor stops operating.

Preferably, if the width of the second logic state of the input signal is greater than the width of the first logic state of the input signal, the spindle motor operates in constant linear velocity (CLV) automatic mode.

Preferably, the widths of the first and second logic states of the input signal are measured by a counter responding to the clock signal.

According to an aspect of the present invention, there is provided an apparatus for controlling a constant linear velocity of a spindle motor used in an optical system. The apparatus includes a mirror signal detection circuit detecting a mirror signal having a pulse width that varies with the constant linear velocity of the spindle motor, which is clocked by rising and falling edges of a tracking zero cross signal; a counter counting up or down widths of first and second logic states of a signal output from the mirror signal detection circuit in response to a clock signal; and a comparator, connected to the counter, comparing a predetermined reference value with an output signal of the counter, and outputting the comparison result. Here, the constant linear velocity of the spindle motor is controlled in response to the comparison result.

Preferably, if a count value is greater than the reference value, the spindle motor stops operating.

Preferably, if the count value is less than the reference value, the spindle motor operates in constant linear velocity (CLV) automatic mode.

Preferably, if the count value is greater than the reference value, the count value is reset.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
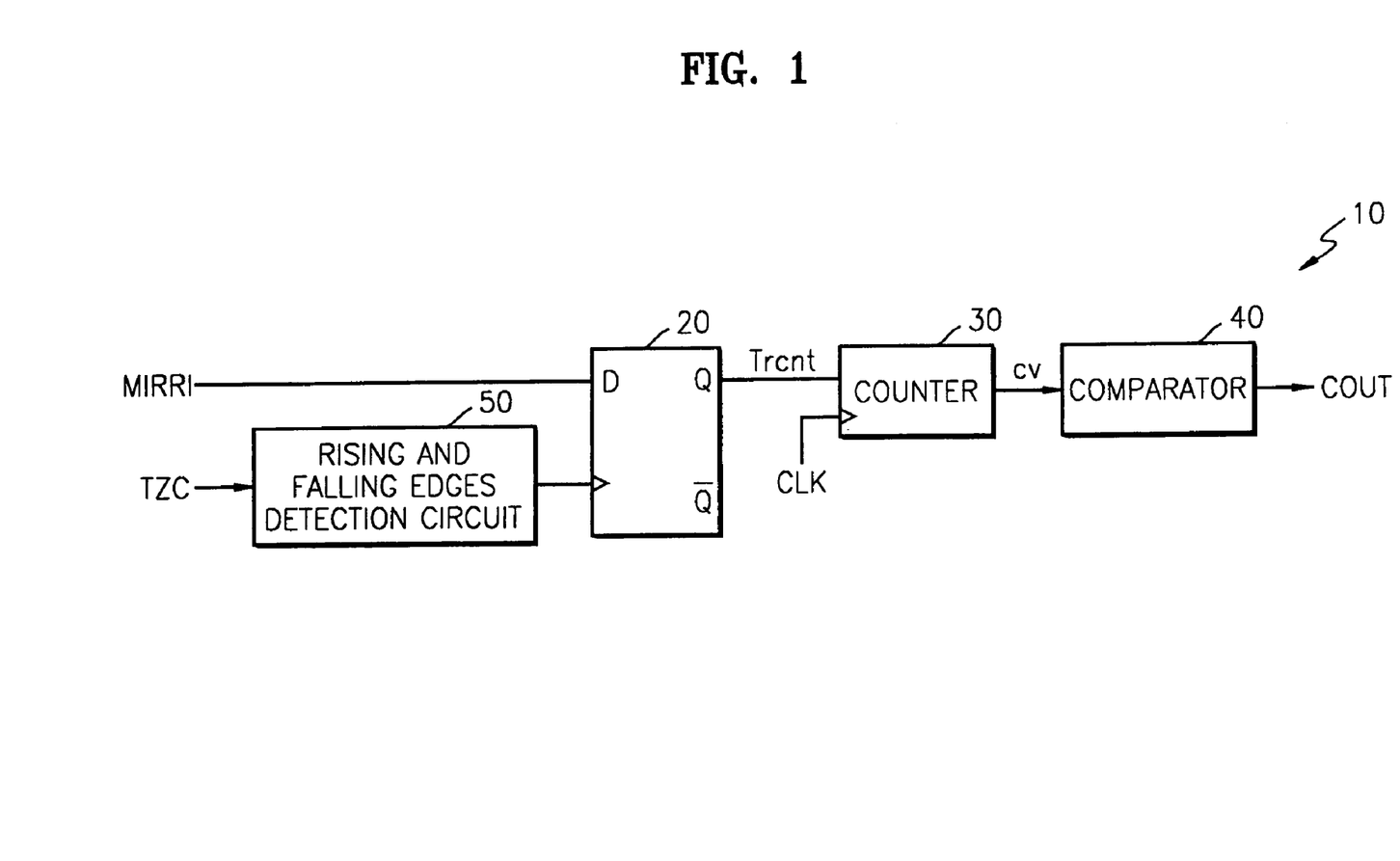
FIG. 1 is a block diagram of an apparatus for controlling the constant linear velocity of a spindle motor, according to a preferred embodiment of the present invention.

FIG. 1 is a block diagram of an apparatus for controlling the constant linear velocity of a spindle motor, according to a preferred embodiment of the present invention. Referring to FIG. 1, an apparatus, which controls the constant linear velocity of a spindle motor (not shown) used for rotating an optical disk, such as a CD, an LD, or a DVD, includes a mirror signal detection circuit 20, a counter 30, a comparator 40, and a rising and falling edges detection circuit 50.

The rising and falling edges detection circuit 50 receives a tracking zero cross signal TZC, detects rising and falling edges of the tracking zero cross signal TZC, and outputs a signal to the mirror signal detection circuit 20 generated as a result of the detection.

The mirror signal detection circuit 20 uses the signal output from the rising and falling edges detection circuit 50 for clock synchronization, the mirror signal detection circuit 20 detects a mirror signal MIRRI having a pulse width that varies with the constant linear velocity of the spindle motor, and transmits a detected mirror signal Trcnt to the counter 30. The mirror signal detection circuit 20 may be realized as, but not limited to, a D flip-flop.

the mirror signal detection circuit 20 latches the mirror signal MIRRI in response to the rising and falling edges of the tracking zero cross signal TZC and outputs the detected mirror signal Trcnt to the counter 30. The output signal Trcnt of the mirror signal detection circuit 20 is then counted by the counter 30.

The counter 30 consecutively up-counts the width of the first logic state (for example, a logic high state) of the signal Trcnt on every cycle of a clock signal CLK and consecutively down-counts the width of the second logic state (for example, a logic low state) of the signal Trcnt on every cycle of the clock signal CLK.

Alternatively, the counter 30 may consecutively down-count the width of the first logic state (for example, a logic high state) of the signal Trcnt on every cycle of the clock signal CLK and may consecutively up-count the width of the second logic state (for example, a logic low state) of the signal Trcnt on every cycle of the clock signal CLK. The counter 30 outputs to the comparator a count value CV, which is obtained by consecutively counting up or down the widths of the first and second logic states of the signal Trcnt for one check cycle depending on the logic state of the signal Trcnt. After one check cycle, the counter 30 is reset in response to a predetermined control signal.

The comparator 40 receives the count value CV output from the counter 30, compares the count value CV with a reference value, and outputs the result COUT of the comparison. The spindle motor stops operating or is set to constant linear velocity (CLV) automatic mode in response to the output signal COUT of the comparator 40. The CLV automatic mode is a mode for automatically controlling the constant linear velocity of an optical disk irrespective of the outer diameter of the optical disk and the optical pickup location during reproduction of data from the optical disk.

Figure 2:
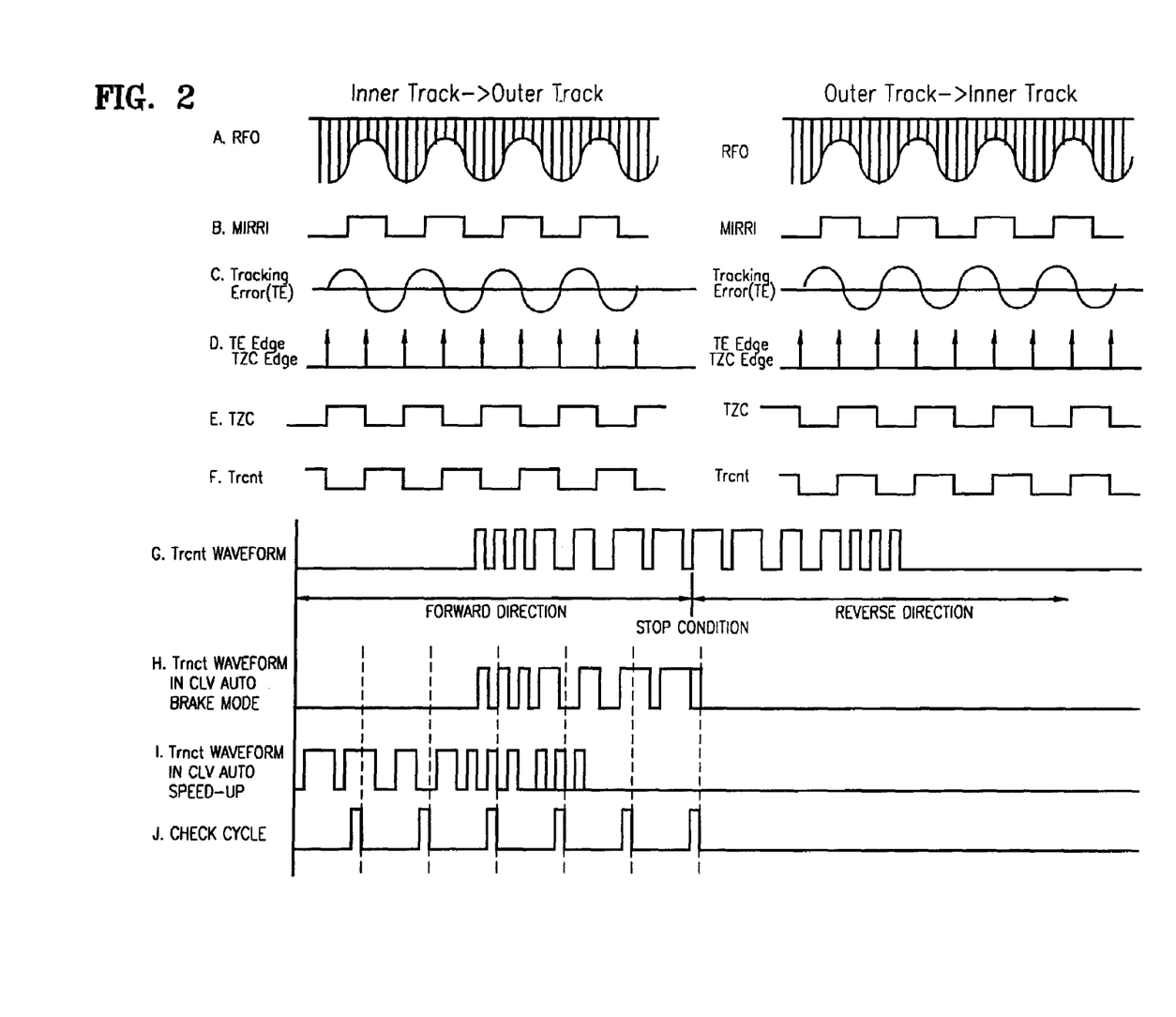
FIG. 2 is a timing diagram illustrating the waveforms of a signal to be counted, which has been detected at a varying constant linear velocity of a spindle motor, according to a preferred embodiment of the present invention.

FIG. 2 is a timing diagram illustrating the waveforms of a signal, which has been detected at a varying constant linear velocity of a spindle motor. In FIG. 2, RFO represents the output signal of a radio frequency (RF) amplifier (not shown), which generally has a frequency of 196 kHz–720 kHz.

A mirror signal MIRRI is used in counting the number of tracks that an optical pickup jumps over when moving from an inner track to an outer track or from an outer track to an inner track. The mirror signal MIRRI is a signal generated by detecting a bottom envelope of the main beam of an optical pickup. The mirror signal MIRRI generally has a frequency of 500 Hz–100 kHz.

A tracking error signal TE is generated due to the difference between two side beams E and F of an optical pickup. A tracking zero cross signal TZC is a signal generated by detecting the location where the tracking error signal TE coincides with a reference voltage, for example 0V.

Since the frequency of the output signal RFO of the RF amplifier ranges from 196 kHz to 720 kHz, the mirror signal detection circuit 20 cannot detect the mirror signal MIRRI in the case of an optical disk rotating at normal speeds ranging from 1.2 m/s to 1.4 m/s. In other words, the output signal Trcnt of the counter 20 has a second logic state.

However, if the rotation speed of a spindle motor decreases due to a stop command that applies maximum reverse voltage to the spindle motor, the frequency of the output signal RFO of the RF amplifier also decreases, and therefore it is possible to detect the signal Trcnt from the mirror signal MIRRI.

In other words, during spindle brake mode or CLV brake mode, a maximum reverse voltage is applied to a spindle motor rotating in a forward direction, and the rotation speed of a spindle motor decreases, and accordingly, the width of the first logic state of the signal Trcnt increases. However, in accordance with the spindle motor's increased rotation speed in the reverse direction, due to the maximum reverse voltage applied to the spindle motor, the frequency of the output signal RFO of the RF amplifier increases again, and thus the width of the first logic state of the signal Trcnt continues to decrease.

Referring to FIG. 2(G), the width of the first logic state of the output signal Trcnt in the mirror signal detection circuit 20 varies with the rotation speed of the spindle motor. More specifically, the width of the first logic state of the output signal Trcnt in the mirror signal detection circuit 20 is inversely proportional to the rotation speed of the spindle motor, irrespective of whether the spindle motor rotates in a forward direction or a reverse direction.

Referring to FIG. 2(H), as the rotation speed of the spindle motor decreases in response to the stop command set during a spindle brake mode, the width of the first logic state of the signal Trcnt continues to increase. However, as shown in FIG. 2(I), as the rotation speed of the spindle motor increases in response to a reproduce command set during spindle kick mode or CLV kick mode, the width of the first logic state of the signal Trcnt continues to decrease. The spindle kick mode describes the application of maximum acceleration voltage to a motionless spindle motor for the purpose of rotating the spindle motor at a predetermined speed.

Referring to FIG. 2(J), the counter 30 resets a count value and current time in response to a pulse activated every check cycle.

A method of controlling the constant linear velocity of a spindle motor used in an optical system, according to a preferred embodiment of the present invention, involves two steps. First, the widths of the first and second logic states of the input signal MIRRI, TZC, or Trcnt, varying with the rotation speed of the spindle motor, are counted in response to the clock signal CLK, the count value CV for one check cycle is compared with a reference value, and the comparison result COUT is output. Second, the constant linear velocity of the spindle motor is controlled in response to the comparison result COUT.

Figure 3A:
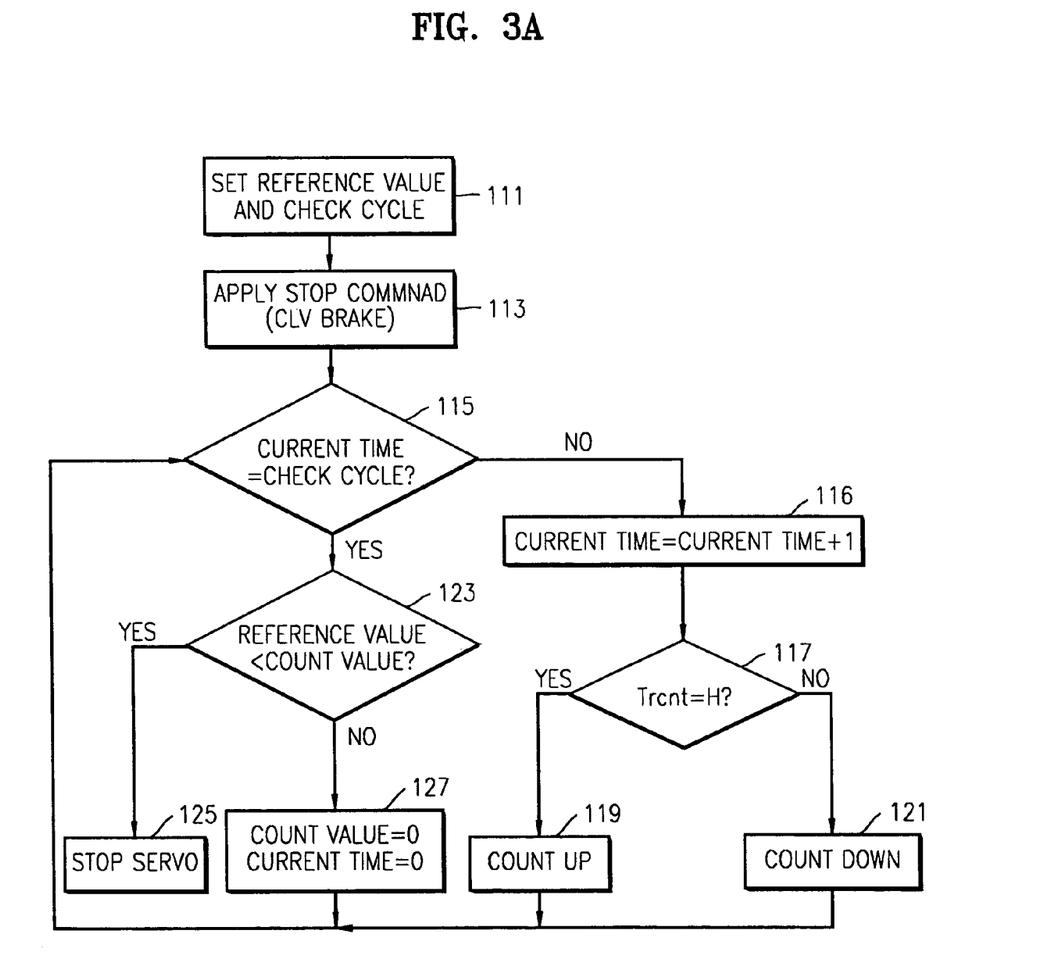
FIG. 3A is a flowchart of a method of controlling the constant linear velocity of a spindle motor in response to a stop command, according to a preferred embodiment of the present invention.
Figure 3B:
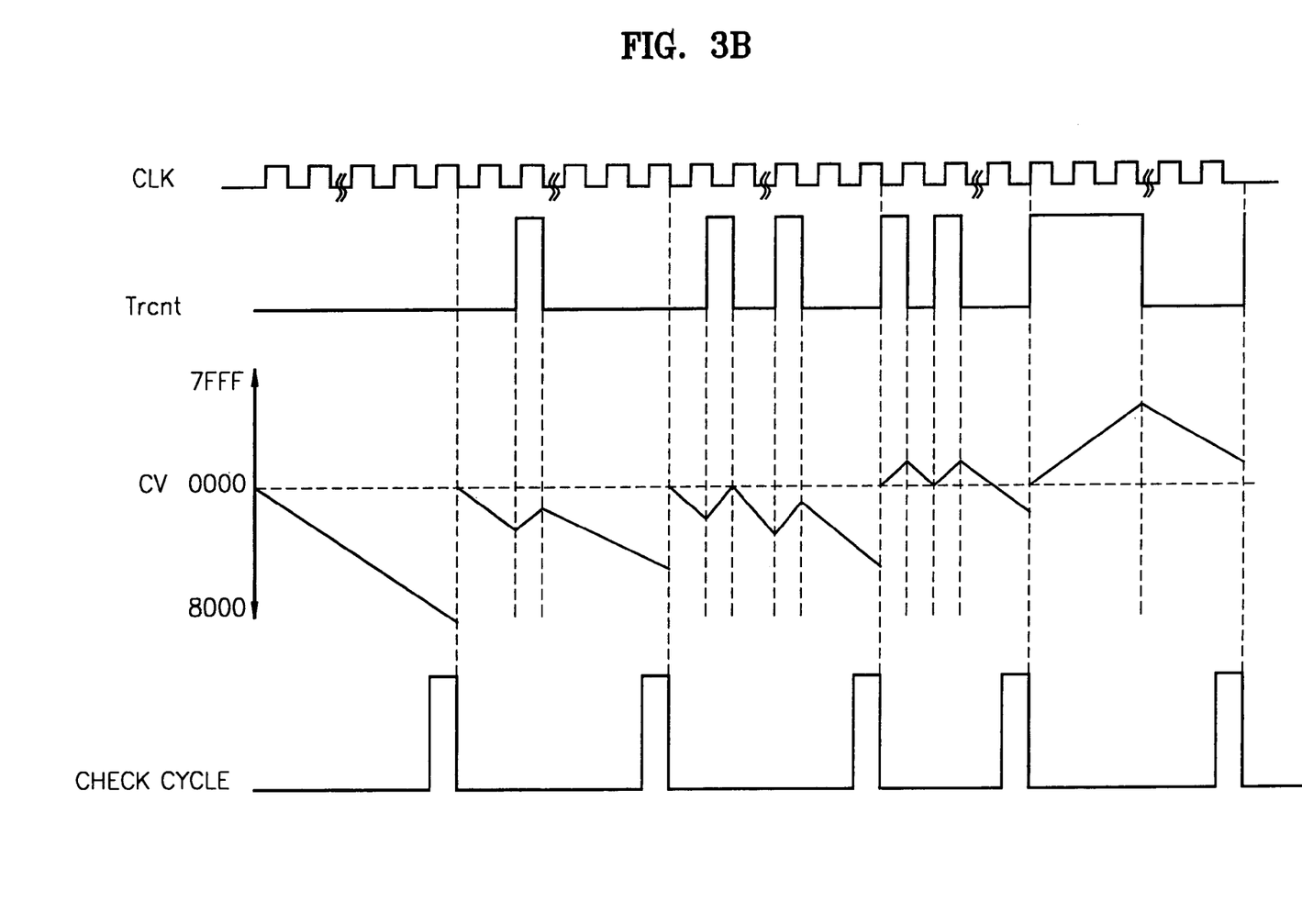
FIG. 3B is a timing diagram illustrating the output of a counter and the waveform of a signal, having a pulse width varying in response to a stop command.

FIG. 3A is a flowchart of a method of controlling the constant linear velocity of a spindle motor in response to a stop command, according to a preferred embodiment of the present invention. FIG. 3B is a timing diagram illustrating the output of a counter and the waveform of a signal, having a pulse width varying in response to a stop command.

Referring to FIGS. 1, 3A, and 3B, a user sets the reference value and check cycle in step 111. Alternatively, the reference value and the check cycle may be set with default values by an optical system manufacturer.

For the convenience of explanation, let us assume that the reference value is a hexadecimal number (0000), the check cycle is 5 ms, and the clock signal CLK has a frequency of 200 kHz.

When a stop command is applied to the servo controlling the spindle motor in step 113, while the focus servo and the tracking servo of an optical system are turned on, the rotation speed of the spindle motor decreases because the servo outputs a spindle brake signal to the spindle motor set to spindle brake mode.

In step 115, the servo determines whether or not current time is equal to the check cycle set in step 111. If the current time is not equal to the check cycle set in step 111, the current time is increased by as much as 1 unit, for example, one clock cycle, in step 116 and the method proceeds to step 117. In step 117, the servo controlling the rotation speed of the spindle motor determines whether or not the signal Trcnt is in the first logic state.

As the result of the determination in step 117, if the signal Trcnt is in the first logic state, the method proceeds to step 119 and the counter 30 outputs a count value of 0001 by counting up from the reference value 0000 by 1. On the other hand, if the signal Trcnt is not in the first logic state, the counter 30 outputs a count value FFFF by counting down from the reference value 0000 by 1 in step 121. Step 115 is then performed every clock cycle or every check cycle. If the current time equals the check cycle, the method moves on to step 123.

In other words, the counter 30 determines whether the signal Trcnt is in the first or second logic state every cycle of the clock signal CLK until the check period set in step 111 passes and performs up-counting or down-counting in response to the logic state of the signal Trcnt.

In step 123, the comparator 40 compares the count value CV obtained by the counter 30 in one check cycle with the reference value set in step 111. If the reference value 0000 is less than the count value CV, the condition for stopping the rotation of the spindle motor is satisfied, and the spindle motor stops operating in step 125. In other words, the focus servo, the tracking servo, the sled servo, and the spindle servo are turned off.

However, if the reference value 0000 is greater than the count value CV, the servo continuously outputs the spindle brake signal to the spindle motor. At this time, the counter 30 and the current time are reset, and the count value CV of the counter 30 is set to 0 in step 127.

Since the rotation speed of the spindle motor, set to spindle brake mode, decreases in response to the spindle brake signal in the spindle brake mode, the width of the first logic state for the signal Trcnt increases, and the method goes back to step 115.

In other words, if a stop command is applied to the spindle motor, the operation mode of the spindle motor is set to CLV brake mode and, if the stop condition mentioned above with reference to FIG. 3A is satisfied, the spindle motor stops operating.

Referring to FIG. 3B, if the signal Trcnt maintains a second logic state, the output signal CV of the counter 30 is obtained by counting down from the reference value 0000 every cycle of the clock signal CLK. Accordingly, the output signal CV of the counter 30, for one check cycle, is less than the reference value 0000.

Accordingly, the count value CV is not greater than the reference value 0000 and the rotation of the spindle motor is not stopped. Thus, the counter 30 and current time are reset, and the spindle brake signal necessary to decrease the rotation speed of the spindle motor, set to spindle brake mode, is continuously applied to the spindle motor. In addition, the stop condition is checked every check cycle. If the stop condition is satisfied, the spindle motor stops operating.

In other words, if the width of the first logic state of the signal Trcnt is greater than the width of the second logic state of the signal Trcnt in one check cycle, then the output signal CV of the counter 30 is greater than the reference value 0000 and, because the stop condition is satisfied, the spindle motor stops operating.

Figure 4A:
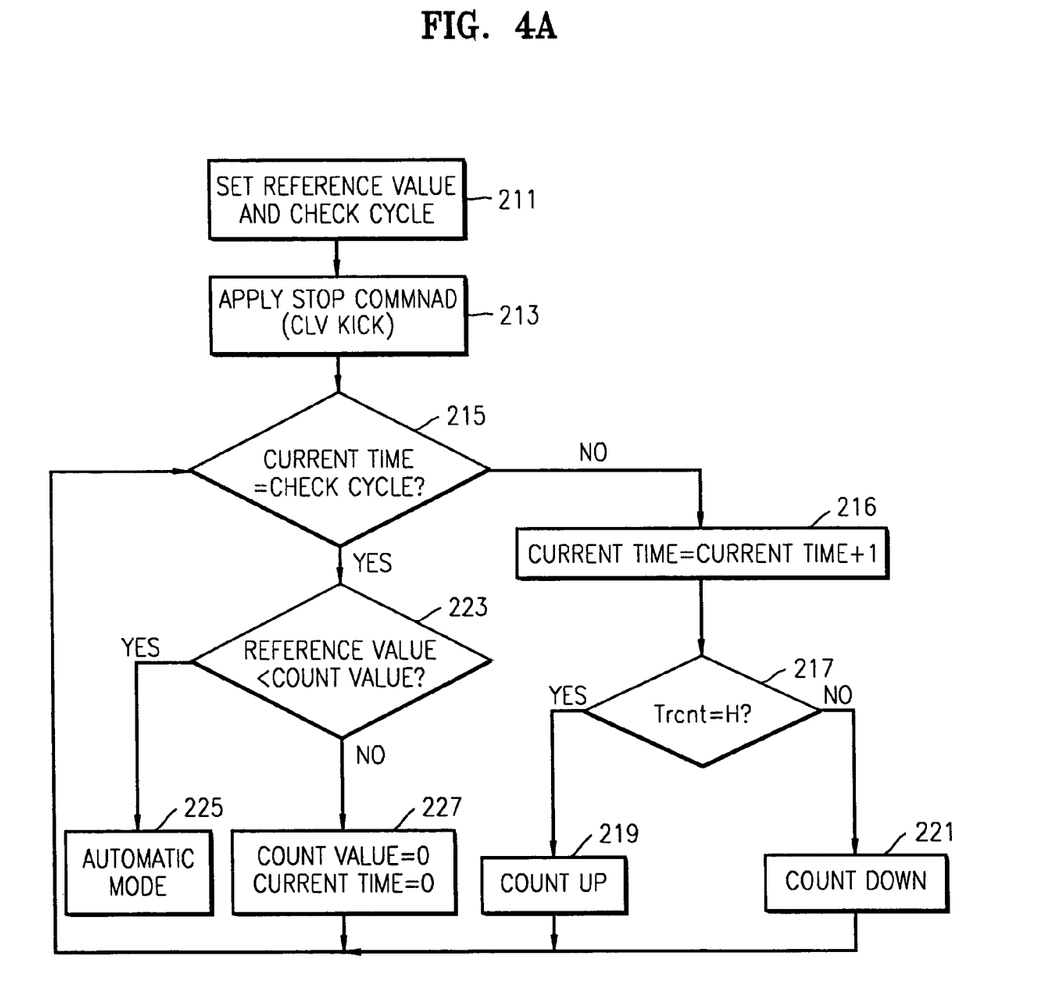
FIG. 4A is a flowchart of a method of controlling the constant linear velocity of a spindle motor in response to a reproduce command, according to a preferred embodiment of the present invention.
Figure 4B:
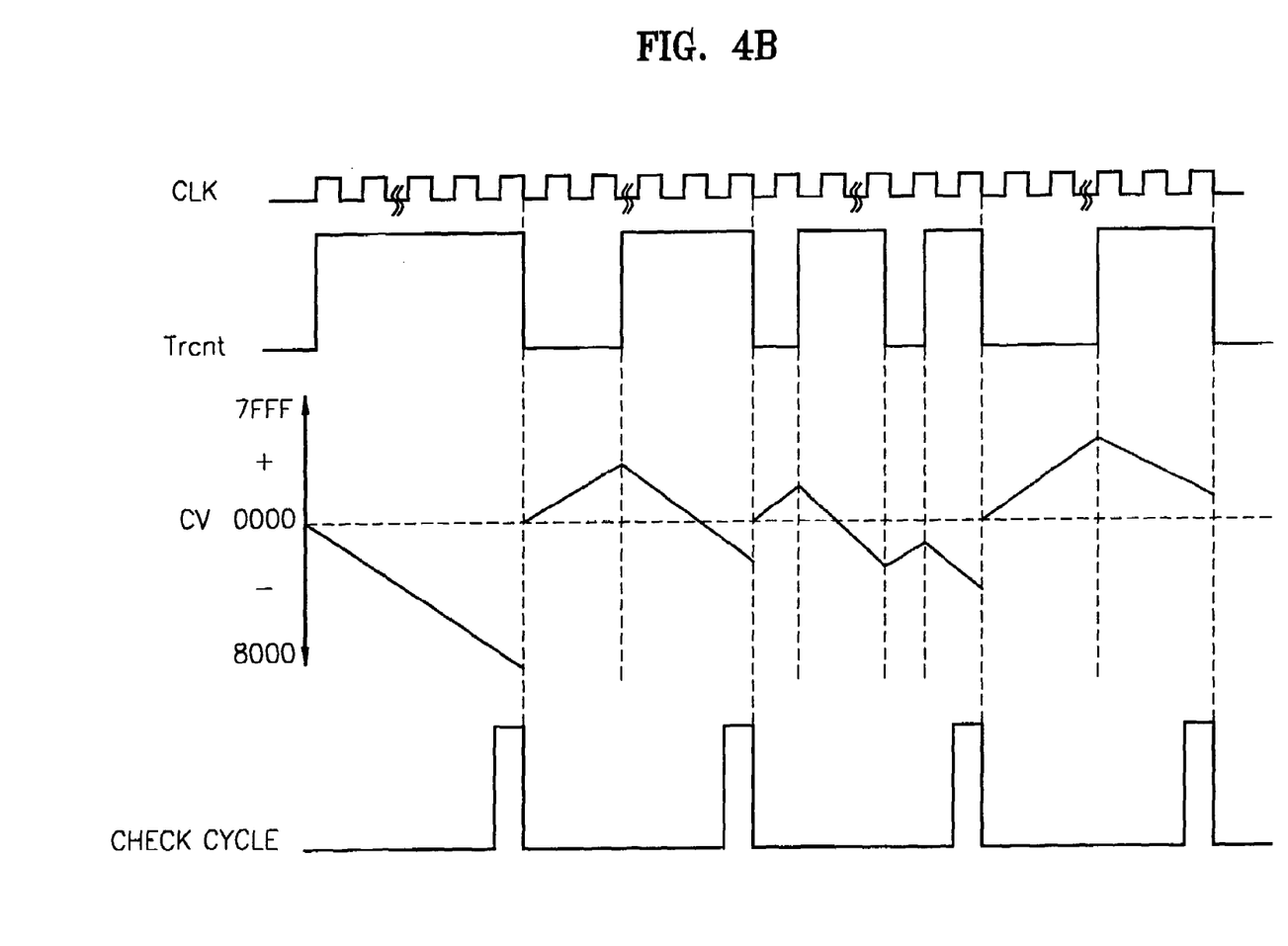
FIG. 4B is a timing diagram illustrating the output of a counter and the waveform of a signal, having a pulse width varying in response to a reproduce command.

FIG. 4A is a flowchart of a method of controlling the constant linear velocity of a spindle motor in response to a reproduce command, according to a preferred embodiment of the present invention. FIG. 4B is a timing diagram illustrating the output of a counter and the waveform of a signal, having a pulse width varying in response to a reproduce command.

Referring to FIGS. 1, 4A, and 4B, a user sets the reference value and check cycle in step 211. Alternatively, the reference value and the check cycle may be set with default values by an optical system manufacturer as defaults.

When the reproduce command is applied in step 213, the rotation speed of a spindle motor increases in response to a kick signal while the focus servo and the tracking servo are turned on. In other words, the spindle motor enters the spindle kick mode.

In step 215, current time is compared to the check cycle set in step 211. If the current time is not equal to the check cycle set in step 211, the current time is increased by as much as one unit in step 216. In step 217, the logic state of the signal Trcnt is determined.

If the signal Trcnt is in the first logic state every cycle of the clock signal CLK, the counter 30 counts down the reference value 0000 by 1 in step 221. If the signal Trcnt is in the second logic state, the counter 30 counts up the reference value 0000 by 1 in step 219.

If step 215 is performed every cycle of the clock signal CLK from a second clock, the counter 30 determines every cycle of the clock signal CLK the logic state for the signal Trcnt, in step 217. Thereafter, the counter 30 performs up-counting or down-counting depending on the logic state of the signal Trcnt in steps 219 and 221.

In step 215, if the current time is equal to the check cycle set in step 211, the method proceeds to step 123 and the comparator 40 compares the count value CV from the counter 30 with the reference value 0000. If the count value CV is greater than the reference value 0000, CLV automatic mode is performed in step 225. The CLV automatic mode (or a normal mode) is a mode for automatically controlling the constant linear velocity of the spindle motor irrespective of the outer diameter of the optical disk and the location of an optical pickup during reproduction of data from the optical disk.

On the other hand, if the count value CV is less than the reference value 0000, the rotation speed of the spindle motor increases, and the counter 30 and the current time are reset in step 227. Thereafter, the counter 30 performs up-counting or down-counting depending on the logic state of the signal Trcnt to be counted.

In other words, if the width of the second logic state of the signal Trcnt is greater than the width of the first logic state of the signal Trcnt in one check cycle, then the output signal CV of the counter 30 is greater than the reference value 0000, and the spindle motor is set to CLV automatic mode. Referring to FIG. 4B, the counter counts down when the signal Trcnt is in the first logic state and counts up when the signal Trcnt is in the second logic state.

That is, when a reproduce command is applied, the spindle motor, set to spindle kick mode, accelerates its rotation speed and, if a predetermined condition is satisfied, enters CLV automatic mode.

As described above, the apparatus and method for controlling the constant linear velocity of a spindle motor, according to the present invention, are capable of controlling the constant linear velocity of a spindle motor during reproduction of data from the optical disk without being affected by the location of an optical pickup and the outer diameter of the optical disk. Control is achieved by determining the widths of first and second logic states of a signal during one period of a clock signal and controlling the constant linear velocity of the spindle motor based on the result of the determination. Accordingly, in the case of reproducing data from an optical disk, it is possible to increase the constant linear velocity of the spindle motor precisely and thus decrease read-in time.

According to the present invention, damage to an optical disk can be prevented by immediately and precisely stopping the optical disk.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a constant linear velocity of a spindle motor when an operation control command is issued, comprising:

counting, in response to a clock signal, widths of first and second logic states of an input signal, said widths varying with rotation speed of the spindle motor, comparing a predetermined reference value with a count value for one check cycle, and outputting the comparison result; and controlling the constant linear velocity of the spindle motor in response to the comparison result; wherein if the count value for one check cycle is less than the predetermined reference value, the count value is reset.

2. The method of claim 1, wherein the input signal is one of (i) a mirror signal, (ii) a tracking zero cross signal, and (iii) the mirror signal clocked by the tracking zero cross signal.

3. The method of claim 1, wherein the operation control command is one of a stop command and a reproduce command.

4. The method of claim 1, wherein the count value increases in response to the first logic state of the input signal and decreases in response to the second logic state of the input signal.

5. The method of claim 1, wherein if the count value for one check cycle is greater than the predetermined reference value, the spindle motor stops operating.

6. The method of claim 1, wherein the count value decreases in response to the first logic state of the input signal and increases in response to the second logic state of the input signal.

7. The method of claim 1, wherein if the count value for one check cycle is greater than the predetermined reference value, the spindle motor operates in constant linear velocity automatic mode.

8. A method of controlling a constant linear velocity of a spindle motor used in an optical system when a stop command is issued, comprising:
 in response to a clock signal, counting up a width of a first logic state of a mirror signal or counting down a width of a second logic state of the mirror signal using a counter for one check cycle, said widths varying with rotation speed of the spindle motor;
 comparing a reference value with a count value obtained from the counter for one check cycle;
 outputting the comparison result; and
 controlling the constant linear velocity of the spindle motor in response to the comparison result; wherein
 if the count value for one check cycle is greater than the reference value, the spindle motor stops operating.

9. The method of claim 8, wherein if the count value for one check cycle is less than the reference value, the count value is reset.

10. A method of controlling the constant linear velocity of a spindle motor used in an optical system when a reproduce command is issued, comprising:
 in response to a clock signal, counting down a width of a first logic state of a mirror signal or counting up a width of a second logic state of the mirror signal using a counter for one check cycle, said widths varying with rotation speed of the spindle motor;
 comparing a reference value with a count value obtained from the counter for one check cycle;
 outputting the comparison result; and
 controlling the constant linear velocity of the spindle motor in response to the comparison result; wherein
 if the count value for one check cycle is less than the reference value, the counter is reset.

11. The method of claim 10, wherein if the count value for one check cycle is greater than the reference value, the spindle motor operates in constant linear velocity automatic mode.

12. A method of controlling a constant linear velocity of a spindle motor, comprising:
 in response to an operation control command, comparing widths of first and second logic states of an input signal, said widths varying with rotation speed of the spindle motor, and outputting the comparison result; and
 controlling the constant linear velocity of the spindle motor in response to the comparison result; wherein
 if the width of the first logic state of the input signal is greater than the width of the second logic state of the input signal, the spindle motor stops operating.

13. The method of claim 12, wherein the input signal is one of (i) a mirror signal, (ii) a tracking zero cross signal, and (iii) the mirror signal clocked by the tracking zero cross signal.

14. The method of claim 12, wherein if the width of the second logic state of the input signal is greater than the width of the first logic state of the input signal, the spindle motor operates in constant linear velocity (CLV) automatic mode.

15. The method of claim 12, wherein the widths of the first and second logic states of the input signal are measured by a counter responding to a clock signal.

16. An apparatus for controlling a constant linear velocity of a spindle motor used in an optical system, the apparatus comprising:
 a mirror signal detection circuit detecting a mirror signal having a pulse width that varies with the linear velocity of the spindle motor, the mirror signal being clocked by rising and falling edges of a tracking zero cross signal;
 a counter counting up or down, in response to a clock signal, widths of first and second logic states of a signal output from the mirror signal detection circuit; and
 a comparator, connected to the counter, comparing a predetermined reference value with an output signal of the counter, and outputting the comparison result,
 wherein the linear velocity of the spindle motor is controlled in response to the comparison result, and
 if a count value is greater than the reference value, the spindle motor stops operating.

17. The apparatus of claim 16, wherein if the count value is less than the reference value, the spindle motor operates in constant linear velocity (CLV) automatic mode.

18. The apparatus of claim 16, wherein if the count value is greater than the reference value, the count value is reset.

19. A method of controlling a constant linear velocity of a spindle motor used in an optical system when a stop command is issued, comprising:
 in response to a clock signal, counting up a width of a first logic state of a mirror signal or counting down a width of a second logic state of the mirror signal using a counter for one check cycle, said widths varying with rotation speed of the spindle motor;
 comparing a reference value with a count value obtained from the counter for one check cycle;
 outputting the comparison result; and
 controlling the constant linear velocity of the spindle motor in response to the comparison result; wherein
 if the count value for one check cycle is less than the reference value, the count value is reset.

20. An apparatus for controlling a constant linear velocity of a spindle motor used in an optical system, the apparatus comprising:
 a mirror signal detection circuit detecting a mirror signal having a pulse width that varies with the linear velocity of the spindle motor, the mirror signal being clocked by rising and falling edges of a tracking zero cross signal;
 a counter counting up or down in response to a clock signal, widths of first and second logic states of a signal output from the mirror signal detection circuit; and
 a comparator, connected to the counter, comparing a predetermined reference value with an output signal of the counter, and outputting the comparison result, wherein the linear velocity of the spindle motor is controlled in response to the comparison result, and if the count value is less than the reference value, the spindle motor operates in constant linear velocity (CLV) automatic mode.

21. An apparatus for controlling a constant linear velocity of a spindle motor used in an optical system, the apparatus comprising:

a mirror signal detection circuit detecting a mirror signal having a pulse width that varies with the linear velocity of the spindle motor, the mirror signal being clocked by rising and falling edges of a tracking zero cross signal;

a counter counting up or down in response to a clock signal, widths of first and second logic states of a signal output from the mirror signal detection circuit; and a comparator, connected to the counter, comparing a predetermined reference value with an output signal of the counter, and outputting the comparison result, wherein the linear velocity of the spindle motor is controlled in response to the comparison result, and if the count value is greater than the reference value, the count value is reset.

* * * * *